(12) United States Patent
Yatsu et al.

(10) Patent No.: US 10,788,665 B2
(45) Date of Patent: Sep. 29, 2020

(54) PROJECTION OPTICAL SYSTEM AND HEAD-UP DISPLAY DEVICE

(71) Applicants: MAXELL, LTD., Kyoto (JP); HITACHI INDUSTRY & CONTROL SOLUTIONS, LTD., Hitachi-shi, Ibaraki (JP)

(72) Inventors: Masahiko Yatsu, Osaka (JP); Kazuomi Kaneko, Osaka (JP); Shigeki Hoshino, Osaka (JP)

(73) Assignees: MAXELL, LTD., Kyoto (JP); HITACHI INDUSTRY & CONTROL SOLUTIONS, LTD., Ibaraki (JP)

( * ) Notice: Subject to any disclaimer, the term of this patent is extended or adjusted under 35 U.S.C. 154(b) by 0 days.

(21) Appl. No.: 15/766,414

(22) PCT Filed: Oct. 9, 2015

(86) PCT No.: PCT/JP2015/078793
§ 371 (c)(1),
(2) Date: Apr. 6, 2018

(87) PCT Pub. No.: WO2017/061040
PCT Pub. Date: Apr. 13, 2017

(65) Prior Publication Data
US 2018/0299672 A1    Oct. 18, 2018

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *G02B 27/0955* (2013.01);
(Continued)

(58) Field of Classification Search
CPC ............ G02B 27/0101; G02B 27/0955; G02B 27/0983; B60K 35/00; B60K 2370/1531; B60K 2370/334; G02F 1/133602
(Continued)

(56) References Cited

U.S. PATENT DOCUMENTS

| 2007/0229394 A1 | 10/2007 | Ishikawa et al. |
| 2009/0046265 A1 | 2/2009 | Komatsuda |

(Continued)

FOREIGN PATENT DOCUMENTS

| JP | 03-236017 A | 10/1991 | |
| JP | H03236017 A | * 10/1991 | ............. G02B 27/02 |

(Continued)

OTHER PUBLICATIONS

International Search Report of PCT/JP2015/078793 dated Dec. 15, 2015.

(Continued)

*Primary Examiner* — Jerry L Brooks
(74) *Attorney, Agent, or Firm* — Mattingly & Malur, PC

(57) ABSTRACT

Provided is a head-up display device which has a virtual image plane shape becoming a part of a concave shape as viewed from the driver side. This head-up display device (30) includes: an image forming unit (10) that displays image information; and a projection optical system including an ocular optical system (5) that displays a virtual image by reflecting light emitted from the image forming unit (10). The ocular optical system (5) includes spherical lenses (51), (52), (53), and a free-form curved surface mirror (56), and is configured by arranging the spherical lenses (51), (52), (53) and the free-form curved surface mirror (56) in this order along the light emission direction.

13 Claims, 15 Drawing Sheets

(51) Int. Cl.
*G02B 27/09* (2006.01)
*G02F 1/13357* (2006.01)

(52) U.S. Cl.
CPC ... *G02B 27/0983* (2013.01); *G02F 1/133602* (2013.01); *B60K 2370/1529* (2019.05); *B60K 2370/1531* (2019.05); *B60K 2370/23* (2019.05); *B60K 2370/334* (2019.05); *G02B 2027/0127* (2013.01)

(58) Field of Classification Search
USPC .......................................................... 359/630
See application file for complete search history.

(56) References Cited

U.S. PATENT DOCUMENTS

| | | | |
|---|---|---|---|
| 2011/0001865 A1 | 1/2011 | Hirao et al. | |
| 2012/0099032 A1* | 4/2012 | Ishikawa | G02B 27/0101 349/11 |
| 2017/0225568 A1* | 8/2017 | Kasahara | G02B 27/0101 |
| 2018/0039077 A1* | 2/2018 | Kuzuhara | B60K 35/00 |
| 2018/0045958 A1* | 2/2018 | Kuzuhara | B60K 35/00 |

FOREIGN PATENT DOCUMENTS

| | | | |
|---|---|---|---|
| JP | 4-34126 U | 3/1992 | |
| JP | 2007-272061 A | 10/2007 | |
| JP | 2007-326419 A | 12/2007 | |
| JP | 2009-44146 A | 2/2009 | |
| JP | 2009-122582 A | 6/2009 | |
| JP | 2009-229552 A | 10/2009 | |
| JP | 2010-164944 A | 7/2010 | |
| JP | 2011-128500 A | 6/2011 | |
| JP | 2013-025205 A | 2/2013 | |
| JP | 2013-127489 A | 6/2013 | |
| JP | 2013-214008 A | 10/2013 | |
| JP | 2014-26244 A | 2/2014 | |
| JP | 2014-126716 A | 7/2014 | |
| JP | 2014126716 A * | 7/2014 | ............. G02B 27/01 |
| WO | 2008/102776 A1 | 8/2008 | |

OTHER PUBLICATIONS

Takahashi, F., "Spectacle Lenses, A Review", Japan Society of Vision Trainers Symposium, 1998, vol. 26, pp. 9-19, with partial translation.

* cited by examiner

FIG. 4

| DESIG-NATION | S No. | SHAPE | RoC | F-F D | GMN | DoE/T | ECCENTRICITY(mm) X-AXIS | ECCENTRICITY(mm) Y-AXIS | TILTING(DEGREE) A X-A | TILTING(DEGREE) A Y-A |
|---|---|---|---|---|---|---|---|---|---|---|
| OP | S0 | OONS | ∞ | 17000 | | | | | | |
| (VIP) | | | | | | | | | | |
| EP | S1 | PS | ∞ | −680 | | | 0 | 0 | 0 | 0 |
| MIRROR (WINDSHIELD) | S2 | ANS | 9686 / 5531 | 0 | REFLECTING | D&R | −340 | −1959 | −43.7 | 0 |
| DS | S3 | PS | ∞ | 317.340 | | NE | 0 | 0 | −127.923 | 1.940 |
| MIRROR | S4 | FCS | −480.847 | 0 | REFLECTING | D&R | −0.821 | −2.913 | −13.792 | 0.394 |
| DS | S5 | PS | ∞ | −143.502 | | NE | 0 | 0 | −41.366 | −0.806 |
| MIRROR | S6 | CS | −268.74401 | 41.095 | REFLECTING | D&B | −0.346 | −41.025 | 55.261 | 1.774 |
| L1 | S7 | FCS | ∞ | 4.5 | 'PMMA25' | NE | 0.405 | 3.688 | −5.784 | 3.398 |
|  | S8 | FCS | ∞ | 5.435 | | D&R | | | | |
| L2 | S9 | SPHERICAL | 217.63 | 8 | FD140_HOYA | NE | −0.129 | −15.727 | −47.323 | −12.926 |
|  | S10 | SPHERICAL | −314 | 5.454 | | | 0 | 0 | 0 | 0 |
| L3 | S11 | SPHERICAL | −101.43 | 3 | FCD1_HOYA | | 0 | 0 | 0 | 0 |
|  | S12 | SPHERICAL | 61.583 | 27.672 | | | 0 | 0 | 0 | 0 |
| L4 | S13 | SPHERICAL | 136.65 | 4.3 | FDS90_HOYA | NE | −6.472 | −21.747 | 13.394 | 9.653 |
|  | S14 | PS | ∞ | 3.6 | | | 0 | 0 | 0 | 0 |
| SoDP | S15 | PS | ∞ | 0.3 | | D&R | 0 | 2.986 | −8.915 | 0 |
|  | S16 | PS | ∞ | 0 | 58.3 | | 0 | 0 | 0 | 0 |
| IP | S17 | PS | ∞ | 0 | | | 0 | 0.209 | 0 | 0 |
| (II) | S18 | PS | ∞ | 0 | | | 0 | 0 | 0 | 0 |

OP: OBJECT PLANE
VIP: VIRTUAL IMAGE PLANE
EP: ENTRANCE PUPIL
DS: DUMMY SURFACE
SoDP: SUBSTRATE OF DIFFUSION PLATE
IP: IMAGE PLANE

II: INTERMEDIATE IMAGE
S No.: SURFACE NUMBER
S0: SURFACE 0
OONS: ODD ORDER NON-SPHERICAL SURFACE
PS: PLANE SURFACE
ANS: ANAMORPHIC NON-SPHERICAL SURFACE
FCS: FREE-FORM CURVED SURFACE

CS: CYLINDRICAL SURFACE
RoC: RADIUS OF CURVATURE
F-F D: FACE-TO-FACE DISTANCE
GMN: GLASS MATERIAL NAME
DoE/T: DETAIL OF ECCENTRICITY/TILTING
D&R: DECENTER & RETURN

NE: NORMAL ECCENTRICITY
D&B: DECENTER & BEND
X-AXIS
Y-AXIS
A X-A: AROUND X-AXIS
A Y-A: AROUND Y-AXIS

FIG. 5

| CODE | | MIRROR SURFACE (SURFACE 4) | SURFACE A OF L1 (SURFACE 7) | SURFACE B OF L1 (SURFACE 8) |
|---|---|---|---|---|
| R | $1/c$ | −480.847 | ∞ | ∞ |
| K | K | | | |
| C2 | X | | | |
| C3 | Y | | | |
| C4 | $X^2$ | −3.31019E−05 | −5.61808E−04 | 1.93302E−02 |
| C5 | XY | −2.81225E−07 | 2.44093E−03 | 2.75602E−03 |
| C6 | $Y^2$ | −2.20162E−04 | −2.57613E−02 | −3.18773E−02 |
| C7 | $X^3$ | 1.24587E−08 | −8.97001E−05 | −1.54019E−04 |
| C8 | $X^2Y$ | −3.55454E−07 | −1.61605E−04 | 1.54170E−04 |
| C9 | $XY^2$ | −1.21165E−08 | −6.64589E−05 | 4.48887E−05 |
| C10 | $Y^3$ | −2.05601E−07 | 5.75922E−04 | −1.57437E−04 |
| C11 | $X^4$ | 2.61613E−10 | −3.05033E−07 | 1.02535E−05 |
| C12 | $X^3Y$ | 7.50191E−11 | 4.37623E−06 | −2.94169E−07 |
| C13 | $X^2Y^2$ | −2.03389E−09 | 4.50929E−06 | 2.60340E−07 |
| C14 | $XY^3$ | 9.97495E−11 | 1.39066E−08 | −1.22346E−06 |
| C15 | $Y^4$ | −3.94976E−10 | 1.72848E−05 | 2.04900E−05 |
| C16 | $X^5$ | −1.46874E−12 | 2.40273E−07 | 5.05979E−10 |
| C17 | $X^4Y$ | 1.96145E−12 | −1.95017E−07 | −3.14769E−08 |
| C18 | $X^3Y^2$ | 1.55873E−12 | −3.82815E−08 | −2.30302E−08 |
| C19 | $X^2Y^3$ | 3.14752E−13 | −4.36939E−08 | 1.05973E−08 |
| C20 | $XY^4$ | 7.35612E−12 | 6.18922E−08 | −3.58785E−09 |
| C21 | $Y^5$ | −4.02952E−12 | 2.16636E−07 | 5.82629E−07 |
| C22 | $X^6$ | | −2.00335E−09 | 6.81061E−09 |
| C23 | $X^5Y$ | | 2.86890E−09 | −7.03614E−10 |
| C24 | $X^4Y^2$ | | 7.23220E−10 | −1.10814E−09 |
| C25 | $X^3Y^3$ | | −1.66237E−09 | 1.28442E−09 |
| C26 | $X^2Y^4$ | | −2.62139E−09 | 4.32324E−09 |
| C27 | $XY^5$ | | −2.15310E−09 | 3.20749E−10 |
| C28 | $Y^6$ | | 5.22670E−09 | 3.27701E−09 |
| C29 | $X^7$ | | −1.08423E−10 | −2.40723E−11 |
| C30 | $X^6Y$ | | −2.39465E−11 | 1.61515E−10 |
| C31 | $X^5Y^2$ | | −8.38932E−11 | −2.30563E−11 |
| C32 | $X^4Y^3$ | | 1.52687E−10 | 1.59783E−10 |
| C33 | $X^3Y^4$ | | 7.63858E−11 | −1.36722E−11 |
| C34 | $X^2Y^5$ | | 2.35573E−10 | 1.70474E−10 |
| C35 | $XY^6$ | | 4.36416E−11 | −1.46511E−12 |
| C36 | $Y^7$ | | 6.50585E−11 | −6.69079E−11 |
| C37 | $X^8$ | | −2.98141E−12 | −3.56298E−13 |
| C38 | $X^7Y$ | | −2.92286E−12 | 2.55893E−12 |
| C39 | $X^6Y^2$ | | 2.74565E−12 | 3.57120E−12 |
| C40 | $X^5Y^3$ | | −1.78417E−13 | −5.43017E−13 |
| C41 | $X^4Y^4$ | | 3.27194E−12 | 3.73008E−12 |
| C42 | $X^3Y^5$ | | 3.43730E−13 | −8.65309E−13 |
| C43 | $X^2Y^6$ | | 5.44433E−12 | 1.63429E−12 |
| C44 | $XY^7$ | | 1.04140E−12 | −3.15889E−13 |
| C45 | $Y^8$ | | 5.40191E−13 | −8.01830E−13 |

FIG. 6

| | OB(S0) |
|---|---|
| 1/c | ∞ |
| K | 0 |
| AR1 | 3.513980516 |
| AR2 | 0.043266278 |
| AR3 | -8.35336E-05 |
| AR4 | -8.27641E-08 |
| AR5 | 2.28998E-10 |
| AR6 | 2.68818E-13 |
| AR7 | -5.84896E-17 |
| AR8 | -2.31109E-18 |
| AR9 | 2.24108E-21 |
| AR10 | 1.39734E-24 |
| AR11 | -2.57236E-28 |
| AR12 | -8.05746E-31 |
| AR13 | -1.56808E-33 |

OB(S0):OBJECT PLANE (SURFACE 0)

FIG. 10
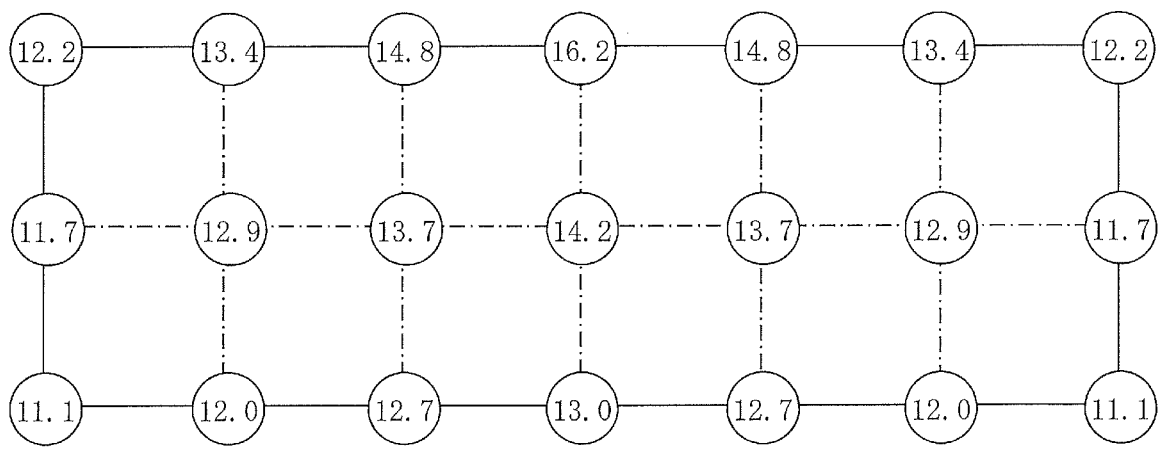
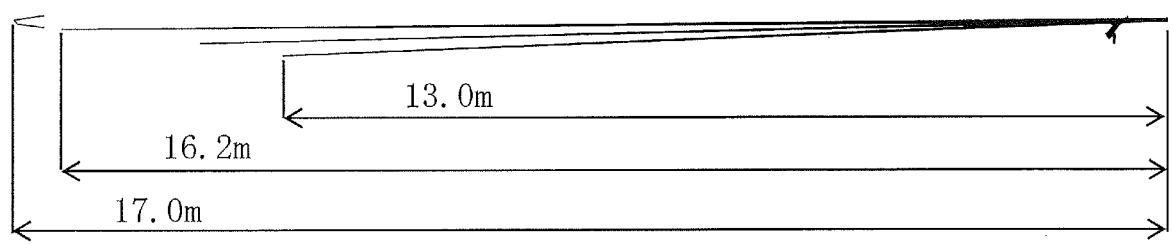
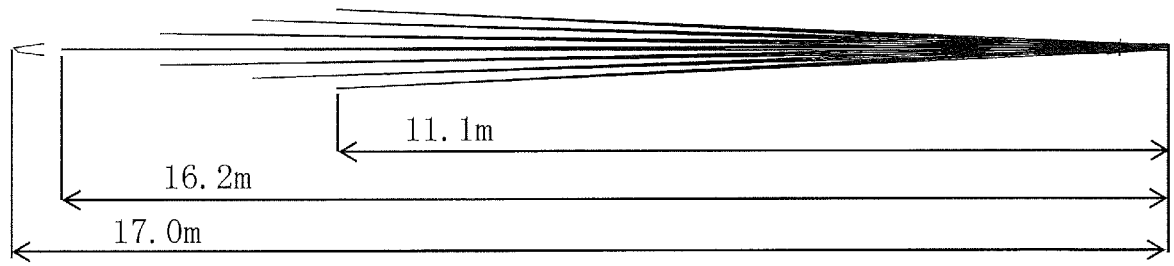

FIG. 14
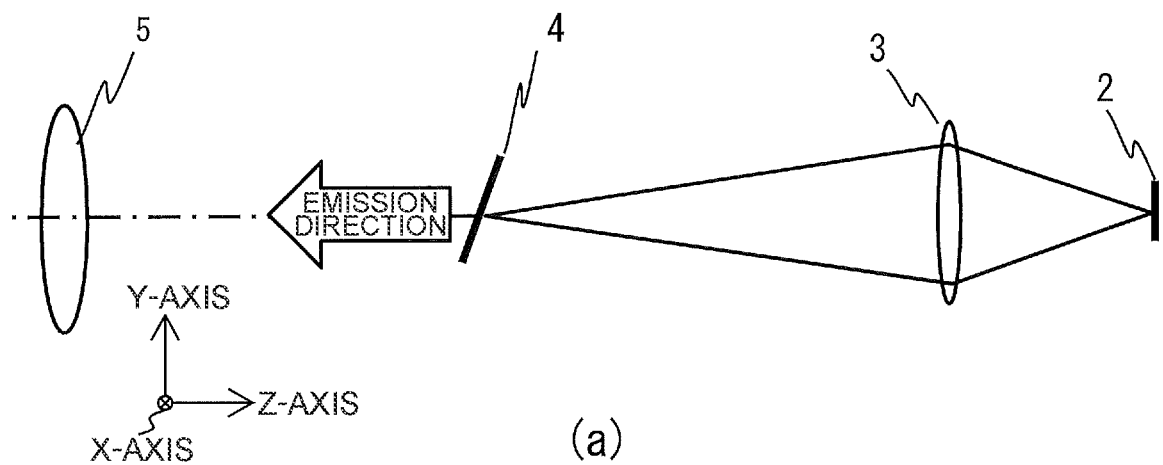
(a)
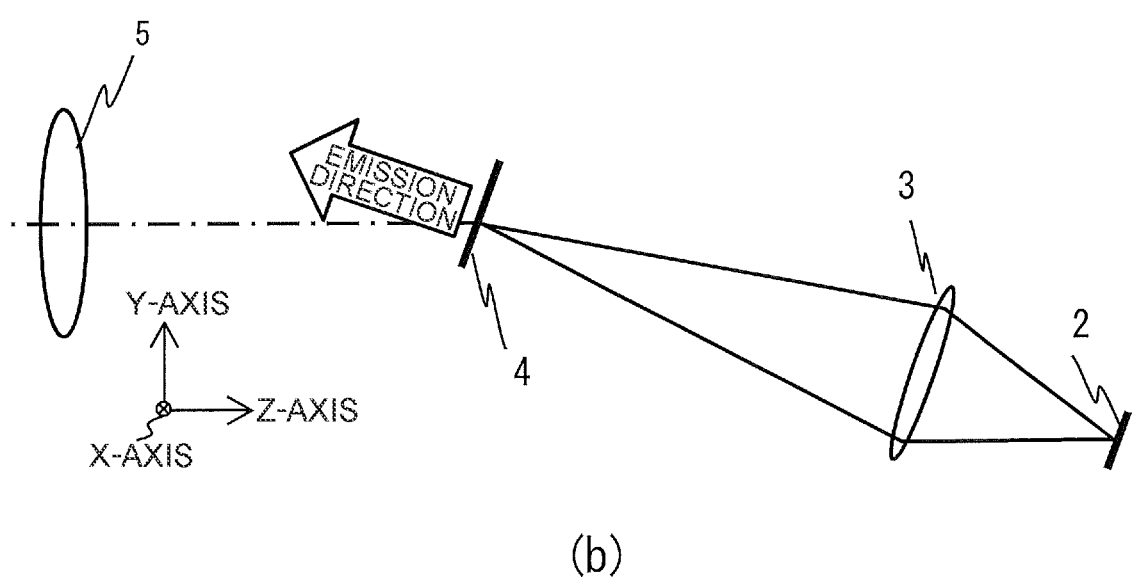
(b)

PROJECTION OPTICAL SYSTEM AND HEAD-UP DISPLAY DEVICE

TECHNICAL FIELD

The present invention relates to a projection optical system and a head-up display device using it, and relates specifically to a projection optical system and a head-up display device using it in which an image is projected to a windshield in an automobile, an airplane, and the like and it is configured that the image is observed as a virtual image through the windshield.

BACKGROUND ART

As a technology according to a head-up display device, in Patent Literature 1, there is disclosed a configuration of "The head-up display device is equipped with: a transmission type liquid crystal display panel; a backlight radiating light to the back of the liquid crystal display panel; and a projection optical system enlarging and projecting an image displayed on the liquid crystal display panel. The projection optical system comprises a relay lens and a projection lens (ocular optical system). The relay lens is constituted to efficiently use telecentric display light by satisfying some conditions, and forms a real image by enlarging the image displayed on the liquid crystal display panel. The projection lens enlarges the real image further and projects it to a windshield of an automobile to display the virtual image for a driver (excerption of the abstract)".

In the head-up display device of this Patent Literature 1, values of various measuring instruments such as the speed meter, tachometer, water temperature meter, fuel gage, and the like are displayed by a virtual image at 2 m forward of the driver. Thus, because the difference between the visual direction of viewing the values of the various measuring instruments by a virtual image and the visual direction of the foreground viewed by the driver becomes small, the time taken for moving the line of sight between these 2 visual directions can be shortened.

Also, because the distance to the virtual image (2 m forward) is closer to the distance to the foreground viewed by the driver compared to the distance of directly viewing various measuring instruments and the like, the time required for focusing the eyes between a state where the eyes are focused on an object in the foreground and a state where the eyes are focused on the virtual image can be also shortened.

With these 2 advantages, it can be expected to improve safety in driving an automobile by the head-up display device.

CITATION LIST

Patent Literature

PATENT LITERATURE 1: JP-A No. 2009-229552

SUMMARY OF INVENTION

Technical Problem

In the head-up display device example disclosed in Patent Literature 1, it is configured that the picture light displayed on the liquid crystal display panel is mapped as a real image (Ir of FIG. 2 of Patent Literature 1) by the relay optical system, and that the virtual image (Iv of FIG. 2 of Patent Literature 1) is observed through the ocular optical system (L1 of FIG. 2 of Patent Literature 1). With respect to the mapping relation, the picture light (plane surface) on the liquid crystal display panel is mapped on the real image Ir (plane surface), and the real image Ir (plane surface) is mapped on the virtual image Iv (plane surface).

However, the foreground of the driver is not a two-dimensional plane surface but a three-dimensional space. Therefore, the line of sight direction from the driver getting on an automobile (own vehicle) and the distance to the foreground will be explained using FIG. 12.

In the field of view as the foreground viewed by the driver of the own vehicle 101, there exist a preceding vehicle 102 traveling in front, a road surface 105 before the preceding vehicle 102 (for example whether there is a fallen object on the road surface and so on), a bicycle running nearby at the side of the road, a pedestrian on the sidewalk, and so on.

Although a line of sight 103 for viewing the preceding vehicle 102 traveling in front becomes a direction of slightly lowering the line of sight from the front direction, a line of sight 104 for viewing the road surface 105 before the preceding vehicle 102 on the road becomes a direction of further lowering the line of sight. Thus, it is known that the distance to an object to be watched out by the driver during driving differs according the line of sight, and that the object to be watched looks as if it is largely tilted in its entire virtual image plane.

Therefore, in order to further improve safety of driving of an automobile, it is important to shorten the time for focusing the eyes by bring the distance to an object gazed during driving and the distance to a virtual image displayed then closer. With respect to this point, according to the technology of Patent Literature 1, there are such circumstances that, even when there exist objects in the different line of sight directions and at different line of sight distances within the three-dimensional space, it is not possible to bring the distance to the objects and the distance to the virtual images of them sufficiently close to each other by displaying information on respective objects on a planar virtual image plane, and a technology for further reducing the load in focusing the eyes by an observer of the virtual image is desired for.

The present invention has been achieved in view of the circumstances described above, and its object is to provide a technology for allowing a driver observing a virtual image using a head-up display device to further reduce the load incurred for moving the line of sight in observing an object and a virtual image that displays information with respect to the object.

Solution to Problem

In order to solve the problem described above, the present invention is a projection optical system including an ocular optical system that displays a virtual image by reflecting light emitted from an image forming unit that emits light including image information, in which the ocular optical system includes a spherical lens and a free-form curved surface mirror and is configured to arrange the spherical lens and the free-form curved surface mirror in this order along the emission direction of the light.

Also, the present invention is characterized to include an image forming unit and the projection optical system in a head-up display device.

Advantageous Effect of Invention

According to the present invention, it is possible to provide a technology for allowing a driver observing a virtual image using a head-up display device to further reduce the load incurred for moving the line of sight in observing an object and a virtual image that displays information with respect to the object. Also, problems, configurations and effects other than those described above will be clarified by explanation of embodiments described below.

BRIEF DESCRIPTION OF DRAWINGS

FIG. 4 is a drawing that shows lens data of the ocular optical system according to the first embodiment.

FIG. 5 is a drawing of free-form curved surface factors of the ocular optical system according to the first embodiment.

FIG. 6 is a drawing of the odd order non-spherical surface factor of the ocular optical system according to the first embodiment.

FIG. 10 is a drawing that expresses the virtual image distance of the ocular optical system of the first embodiment.

FIG. 14 is a drawing for explaining the relation between incidence and emission of picture light at a screen plate (diffusion plate).

DESCRIPTION OF EMBODIMENTS

Hereinafter, an embodiment and various examples of the present invention will be explained using the drawings and the like. Explanations below show concrete examples of the content of the present invention, the present invention is not limited to these explanations, and various alterations and amendments by a person with an ordinary skill in the art can be effected within the range of the technical thoughts disclosed in the present description. Also, in all drawings for explaining the present invention, those having the same function are marked with the same reference sign, and there is a case of omitting repeated explanation for them.

Figure 11:
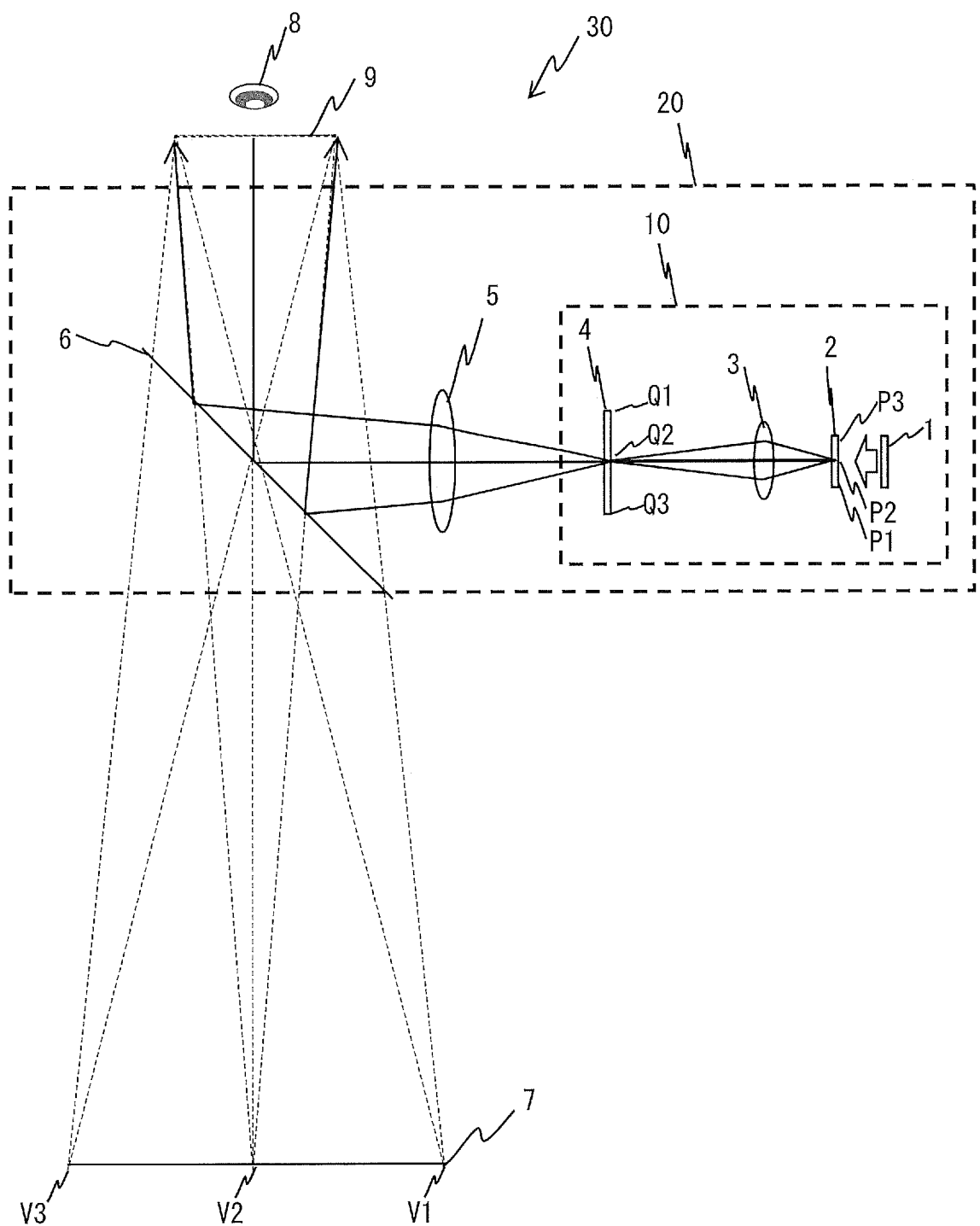
FIG. 11 is a schematic configuration drawing of a head-up display device.
Figure 12:
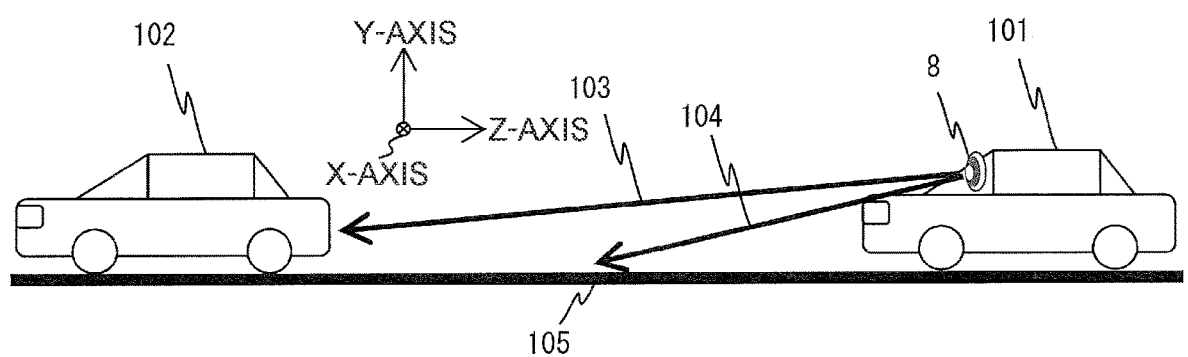
FIG. 12 is a drawing for explaining the difference in the viewing direction of the driver and the distance along the viewing direction.

The basic configuration of a head-up display device will be explained using FIG. 11. FIG. 11 is a schematic configuration drawing of a head-up display device.

A head-up display device 30 shown in FIG. 11 has such configuration that picture light emitted from a projection optical system 20 including an image forming unit 10 and an ocular optical system 5 is made to be reflected by a windshield 6 of an automobile (not illustrated) and is made to be incident on eyes 8 of the driver.

To be more specific, a light flux radiated from a backlight 1 to a liquid crystal display panel 2 is made to be incident on a relay optical system 3 as a picture image light flux including picture information displayed on the liquid crystal display panel 2. By a focusing function of the relay optical system 3, the picture information on the liquid crystal display panel 2 is enlarged and is enlargingly projected onto a screen plate (diffusion plate) 4. Points P1, P2, P3 on the liquid crystal display panel 2 correspond to points Q1, Q2, Q3 of the screen plate (diffusion plate) 4 respectively. By employing the relay optical system 3, a liquid crystal display panel with small display size can be used. Since the backlight 1, the liquid crystal display panel 2, the relay optical system 3, and the screen plate (diffusion plate) 4 form image information (picture information) on the screen plate (diffusion plate) 4, these are collectively referred to as the image forming unit 10.

Next, the image information on the screen plate (diffusion plate) 4 is projected onto the windshield 6 by the ocular optical system 5, and the light flux reflected by the windshield 6 reaches the position of the eyes 8 of the driver. As viewed from the eyes of the driver, the relationship as if the image information of a virtual image plane 7 is viewed is established. The points Q1, Q2, Q3 on the screen plate (diffusion plate) 4 correspond to points V1, V2, V3 of the virtual image plane 7 respectively. Also, the range where the points V1, V2, V3 on the virtual image plane 7 can be seen even when the position of the eyes 8 is moved is an eye box 9. Thus, the ocular optical system is an optical system for displaying an image (virtual image) of an object (spatial image) in front of the eyes of the driver similarly to an ocular lens of a finder of a camera and an ocular lens of a microscope.

Also, the screen plate (diffusion plate) 4 is configured of a micro-lens array that is obtained by arraying micro-lenses two-dimensionally. Thereby, a diffusion action is caused, the spread angle of the light flux emitted from the screen plate 4 is enlarged, and the size of the eye box 9 is made a predetermined size. Also, the diffusion action of the screen plate (diffusion plate) 4 can be achieved also by incorporating diffusion particles.

Although it was explained in the background art, during driving, confirmation of the preceding vehicle (lighting of the brake lamp and right-turn/left-turn lamps), confirmation of the road surface of the road before the preceding vehicle (presence/absence of the fallen object, and so on), confirmation of the bicycle/pedestrian at the side of the road before the road surface, and so on are carried out.

Further, because the driver also confirms information of the speed meter, the fuel gage, and the like, by furnishing a head-up display device and displaying the information of various measuring instruments in front of the driver as a virtual image by the head-up display device, movement of the line of sight of the driver in confirming the measuring instruments becomes small, the time required for focusing the eyes can be shortened, and safety of driving can be improved.

In the meantime, with respect to the preceding vehicle in the foreground, the road surface before the preceding vehicle, and the bicycle/pedestrian at the side of the road before the road surface, because the distance from the driver is different, by changing the distance of the virtual image that displays the information related to them, the time required for focusing the eyes can be further shortened, and safety of driving can be further improved.

The curved surface connecting the position of a preceding vehicle, the road surface before the preceding vehicle, and the position of a bicycle/pedestrian at the end of the road before the road surface looks to be a concave shape as viewed by the driver. The virtual image displayed at a portion of the concave shape is oblique with respect to the ocular optical system.

Here, the first embodiment of the projection optical system will be explained which uses a free-form curved surface lens and a free-form curved surface mirror having a rotationally asymmetric shape capable of achieving an optical system excellent in distortion property even in oblique projection with respect to the image plane (virtual image plane) is effected.

First Embodiment

Figure 1:
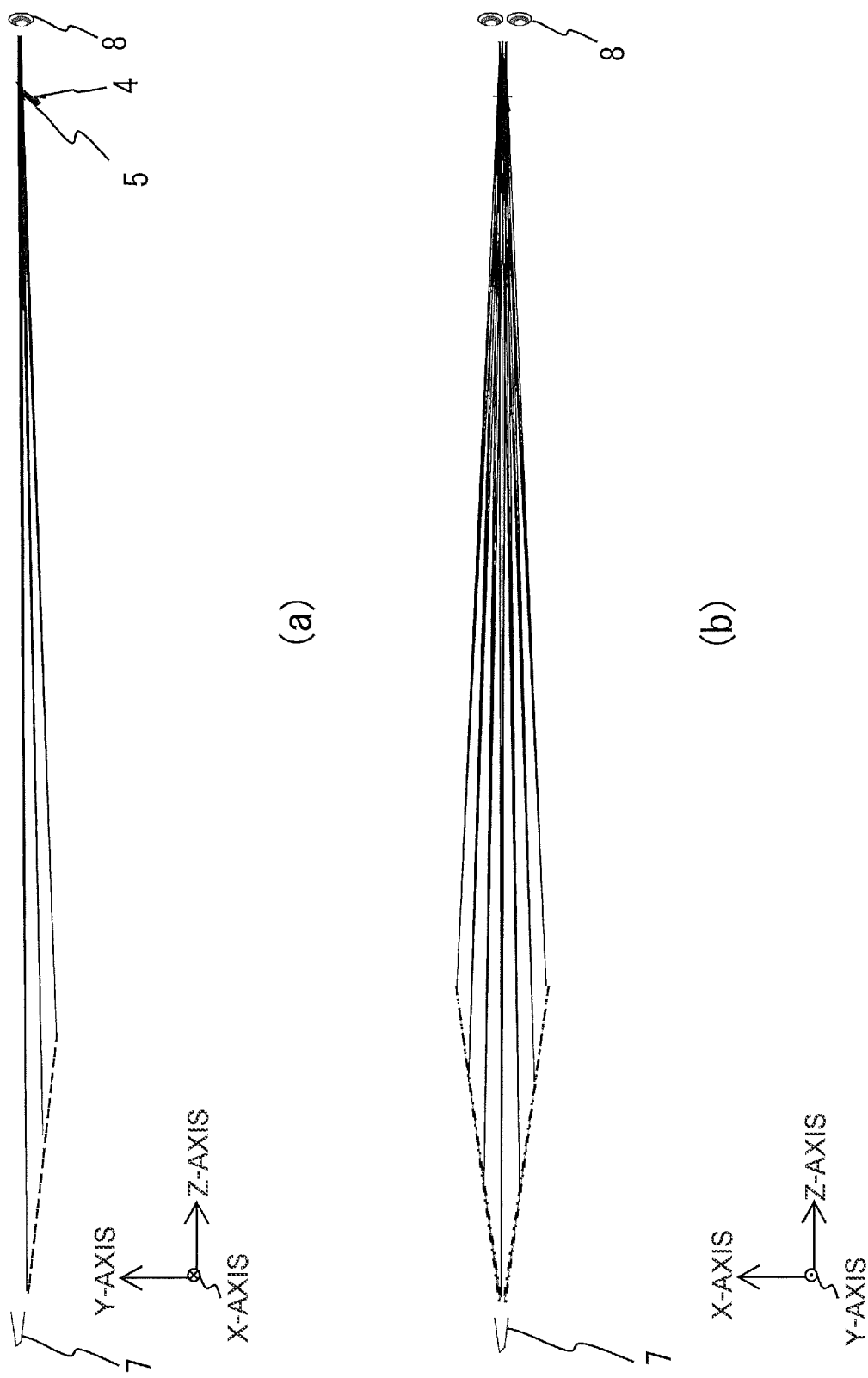
FIG. 1 is a total ray diagram of an ocular optical system of the first embodiment, (a) expresses a state where the picture information of the virtual image plane is viewed by the eyes of the driver in YZ plane, and (b) expresses a state where the picture information of the virtual image plane is viewed by the eyes of the driver in XZ plane.

The first embodiment is characterized particularly in the shape of the virtual image plane 7 in the head-up display device 30 of FIG. 11. In this regard, the shape of the virtual image plane 7 will be explained referring to FIG. 1. FIG. 1 is a total ray diagram of the ocular optical system 5 of the first embodiment, (a) expresses a state where the visual information of the virtual image plane 7 is viewed by the eyes of the driver in YZ plane, and (b) expresses a state where the visual information of the virtual image plane 7 is viewed by the eyes of the driver in XZ plane. The right eye and the left eye overlap each other in YZ plane (refer to the reference sign 8), and the right eye and the left eye are seen separately in XZ plane. Here, the driver corresponds to an observer of a virtual image positioned on the side where light is incident on the virtual image plane.

With respect to the virtual image plane 7 in the YZ plane drawing of FIG. 1(a), when the line of sight lowers relative to the line of sight of the front, the virtual image distance becomes short. Also, with respect to the virtual image plane 7 in the XZ plane drawing of FIG. 1(b), when the line of sight is swung to the right and left relative to the line of sight of the front, the virtual image distance becomes short. Therefore, the virtual image plane viewed from the driver side has a concave shape, and the virtual image is displayed at a portion of the concave shape.

Figure 2:
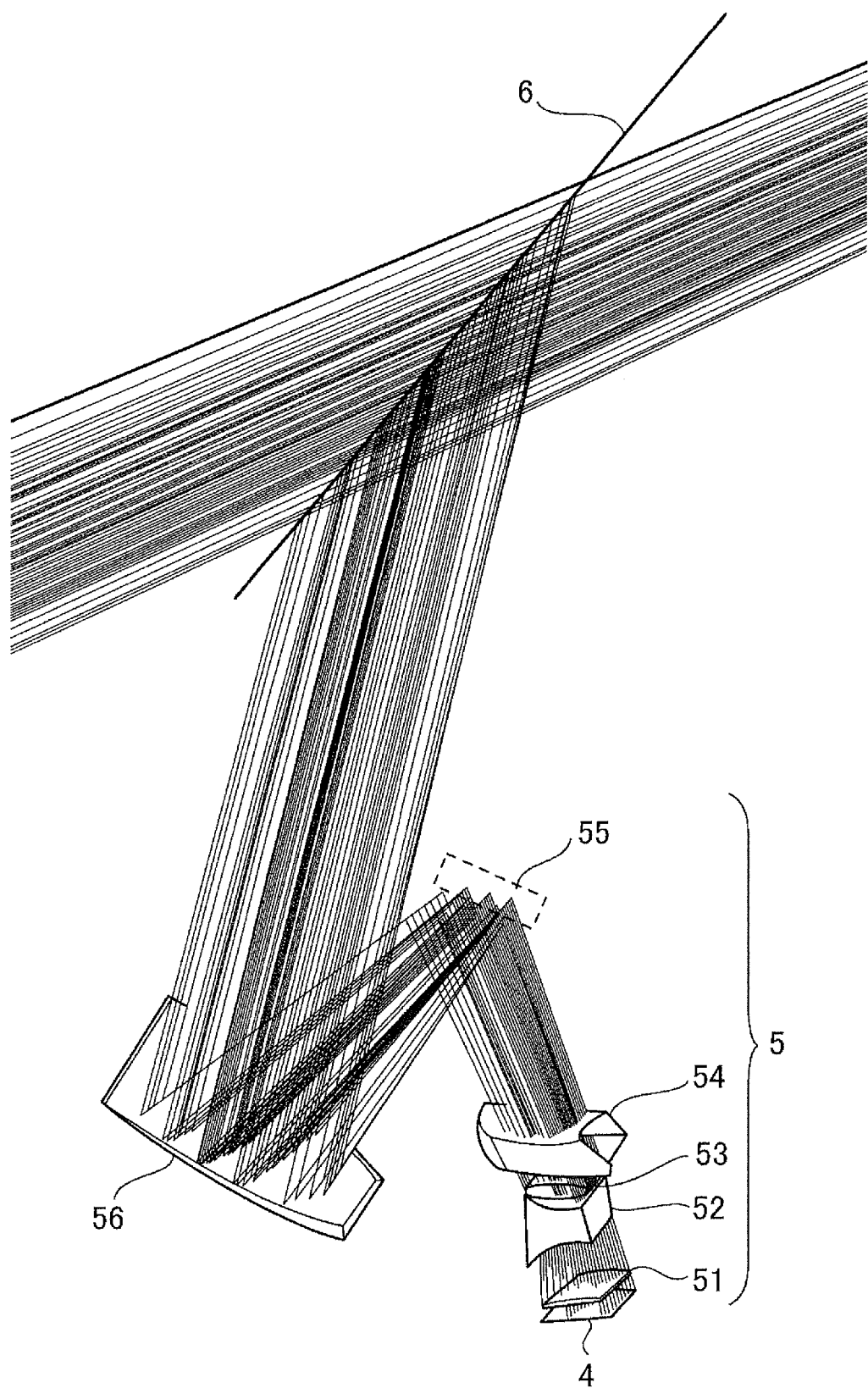
FIG. 2 is an enlarged view of an essential part of the ocular optical system of the first embodiment.

FIG. 2 is an enlarged view of an essential part of the ocular optical system of the first embodiment. As shown in FIG. 2, the ocular optical system 5 is configured so as to arrange, side by side, a convex lens 51 with positive refractive power, a concave lens 52 with negative refractive power, a convex lens 53 with positive refractive power, a rotationally asymmetric free-form curved surface lens 54, a cylinder mirror 55, and a rotationally asymmetric free-form curved surface mirror 56 in front of a windshield 6 in this order from the screen plate (diffusion plate) 4 side. The rotationally asymmetric free-form curved surface lens 54 has an action of correcting trapezoidal distortion.

Figure 3:
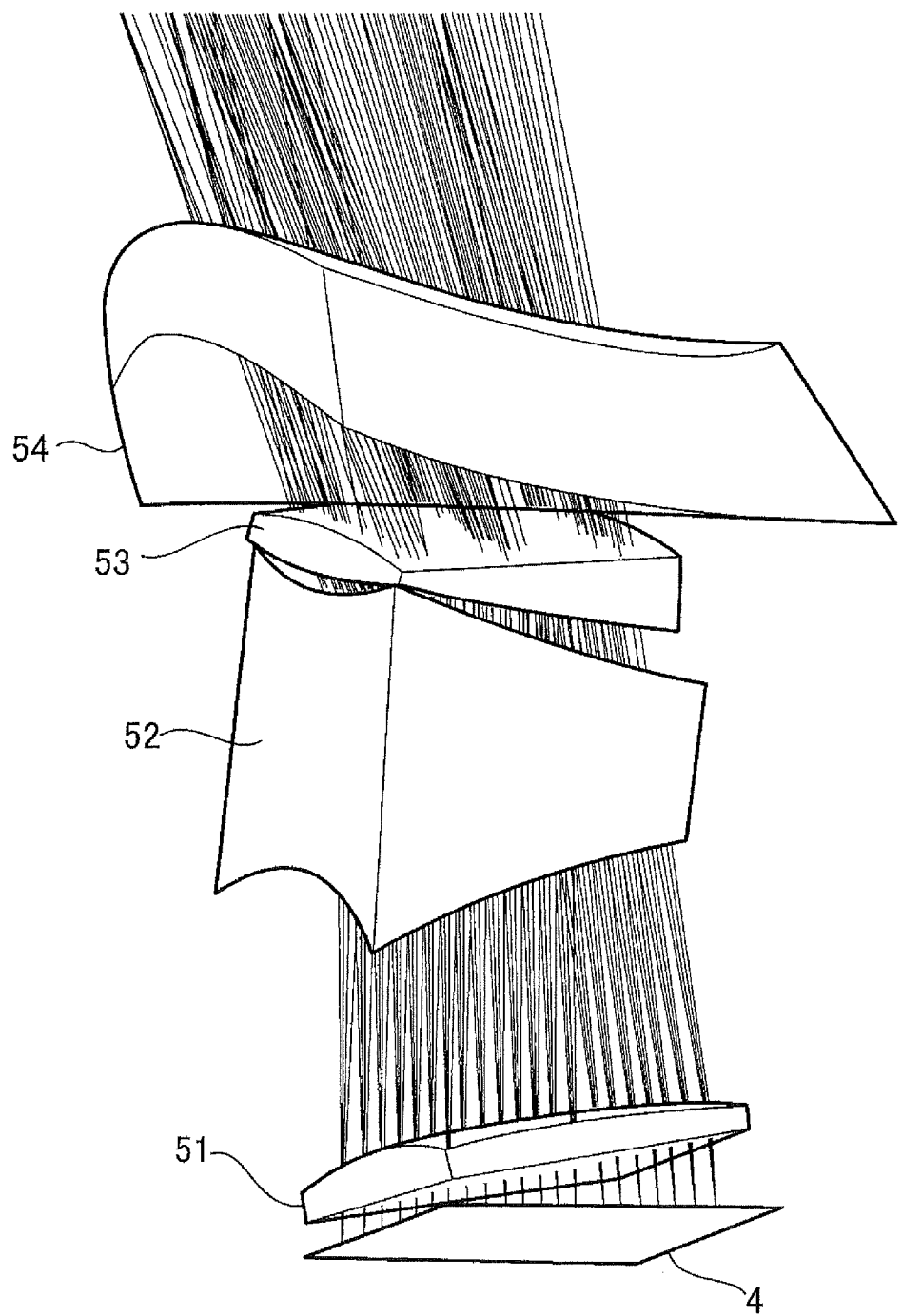
FIG. 3 is a perspective enlarged view of a lens unit of the ocular optical system according to the first embodiment.

FIG. 3 is a perspective enlarged view of a lens unit of the head-up display device according to the first embodiment. As shown in FIG. 3, the free-form curved surface lens 54 is configured to have a rotationally asymmetric shape. Also, the concave lens 52 and the convex lens 53 have large eccentricity (no eccentricity in the front-rear direction).

FIG. 4 is a drawing that shows lens data of the head-up display device according to the first embodiment. In the lens data shown in FIG. 4, the radius of curvature is expressed with a positive mark when the center position of the radius of curvature exists in the traveling direction, and the face-to-face distance expresses the distance on an optical axis from the apex position of each surface to the apex position of the next surface.

"Eccentricity" represents a value in Y-axis direction, and "tilting" represents rotation around X-axis within YZ plane. "Eccentricity/tilting" is applied in the order of eccentricity and tilting at a surface in question. "Ordinary eccentricity" represents that a next surface is arranged at a position of the face-to-face distance on the new coordinate system where eccentricity/tilting have been applied. Eccentricity and tilting of "decenter & return" are applied only the surface in question, and do not affect the next surface.

"PMMA" of the glass material name represents polymethyl methacrylate of a plastic, and "58.3" of the glass material name represents material having the refractive index 1.58 and Abbe's number 30.

FIG. 5 is a drawing of free-form curved surface factors of the head-up display device according to the first embodiment. The free-form curved surface factor of FIG. 5 is obtained by a formula (1) below.

[Formula 1]

$$Z = \frac{c \cdot (x^2 + y^2)}{1 + \sqrt{1 - (1 + K)c^2 \cdot (x^2 + y^2)}} + \sum \sum (Cj(m, n) \times x^m \times y^n) \quad (1)$$
$$j = [(m + n)^2 + m + 3n]/2 + 1$$

Here, a free-form curved surface shape is defined by a rotationally symmetric component (circular cone member) defined by a circular cone constant K and curvature c (=inverse number of radius of curvature) in the coordinate space of XYZ axes (Z-axis=optical axis), and a rotationally asymmetric component (XY polynomial member) defined by a free-form curved surface factor $C_j$.

For example, when X is of the second order (m=2) and Y is of the third order (n=3), a factor of $C_{19}$ where j= {$(2+3)^2+2+3\times3$}/2+1=19 corresponds. Also, the position of the optical axis of each of the free-form curved surface is determined by the amount of eccentricity/tilting in the lens data of FIG. 4.

FIG. 6 is a drawing of the odd order non-spherical surface factor of the head-up display device according to the first embodiment. The odd order non-spherical surface factor of FIG. 6 is obtained by a formula (2) below.

[Formula 2]

$$Z = \frac{c \cdot h^2}{1 + \sqrt{1 - (1 + K)c^2 \cdot h^2}} + \sum ARi \times h^i \quad (2)$$

Here, the odd order non-spherical surface shape is a rotationally symmetric shape, and is defined, in the coordinate space of XYZ axes (Z-axis=optical axis), by a circular cone member defined by a circular cone constant K and curvature c (=inverse number of radius of curvature), the distance h (=$\sqrt{x^2+y^1}$) from the optical axis Z, and the $1^{st}$ to $13^{th}$ factors AR1 to AR13 of h.

Further, the anamorphic non-spherical surface factor of the head-up display device according to the first embodiment is obtained by a formula (3) below. However, the anamorphic non-spherical surface shape is a rotationally asymmetric shape, and is defined by the circular cone constant Kx and the curvature cux (=inverse number of radius of curvature) in XZ cross section and the circular cone constant Ky and the curvature cuy (=inverse number of radius of curvature) in YZ cross section in the coordinate space of XYZ axes (Z-axis=optical axis). With respect to cuy (=1/rdy) and cux (=1/rdx) in the formula (3), rdy=9,686 mm and rdx=5,531 mm in FIG. 4, and all of the other factors were made 0 (description was omitted).

[Formula 3]

$$Z = \frac{cux \cdot x^2 + cuy \cdot y^2}{1 + \sqrt{1 - (1 + Kx)cux^2 \cdot x^2 - (1 + Ky)cuy^2 \cdot y^2}} \qquad (3)$$

Also, the values of the eye box size, field of view angle, and so on of the ocular optical system of the first embodiment are shown below in the order of the horizontal direction and the vertical direction.

Eye box size 100×50 mm

Effective size of picture light at screen plate 40.30×18.86 mm

Virtual image size at tangential plane 1,603×534 mm

Field of view angle (full picture angle) 5.4×1.8 degrees

Figure 7:
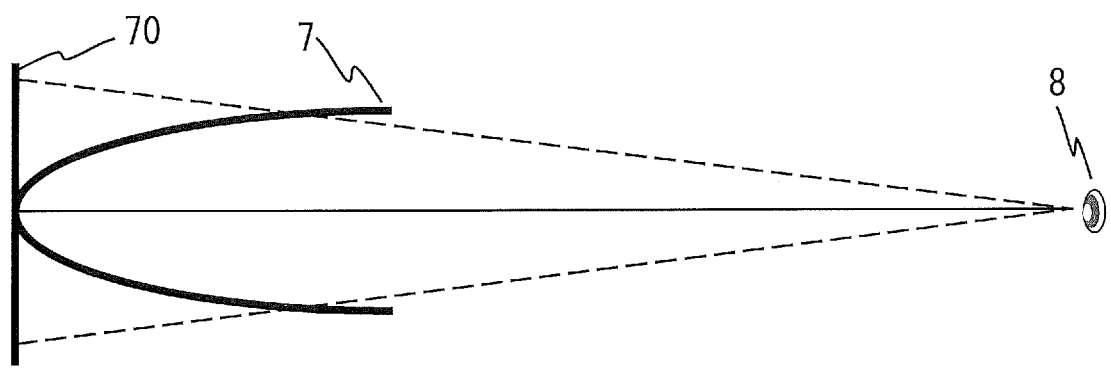
FIG. 7 is an explanatory drawing that shows the relation between a virtual image plane and its tangential plane.
Figure 8:
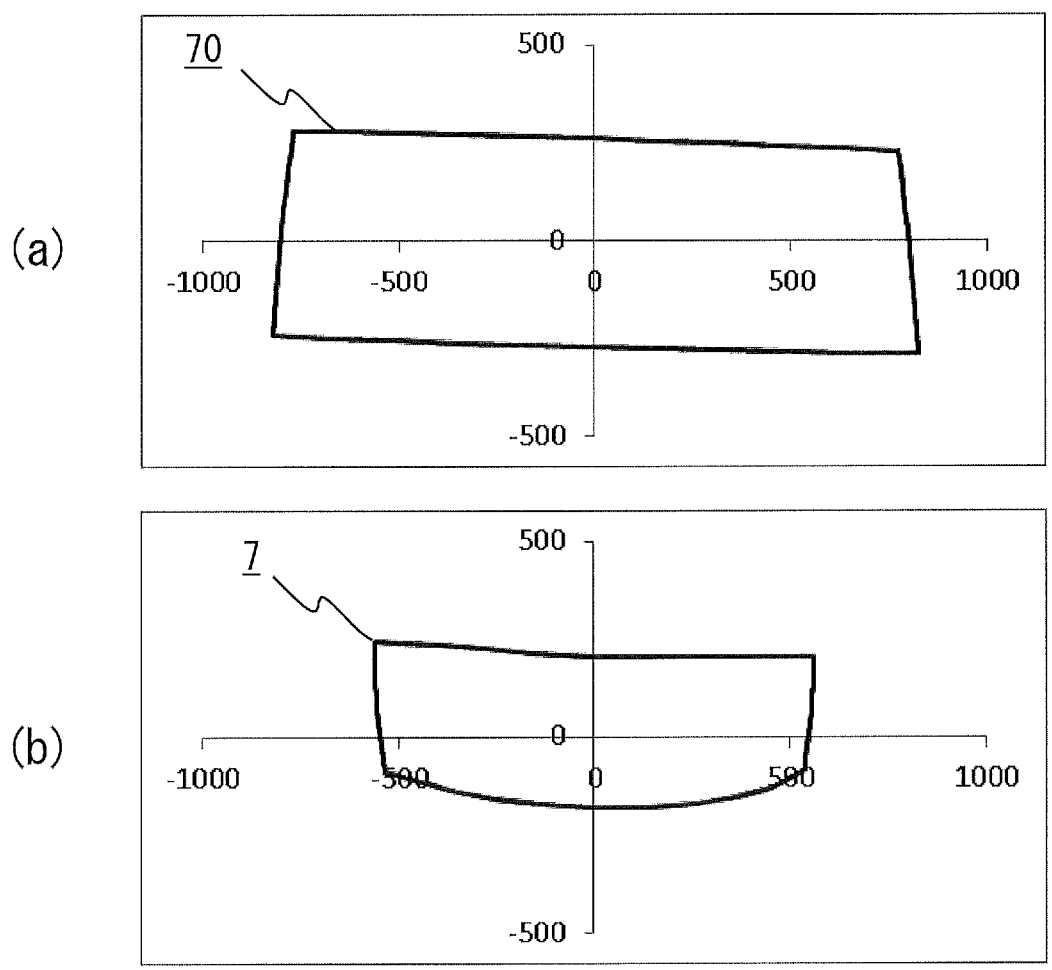
FIG. 8 is a drawing that expresses the distortion property of the ocular optical system according to the first embodiment.
Figure 9:
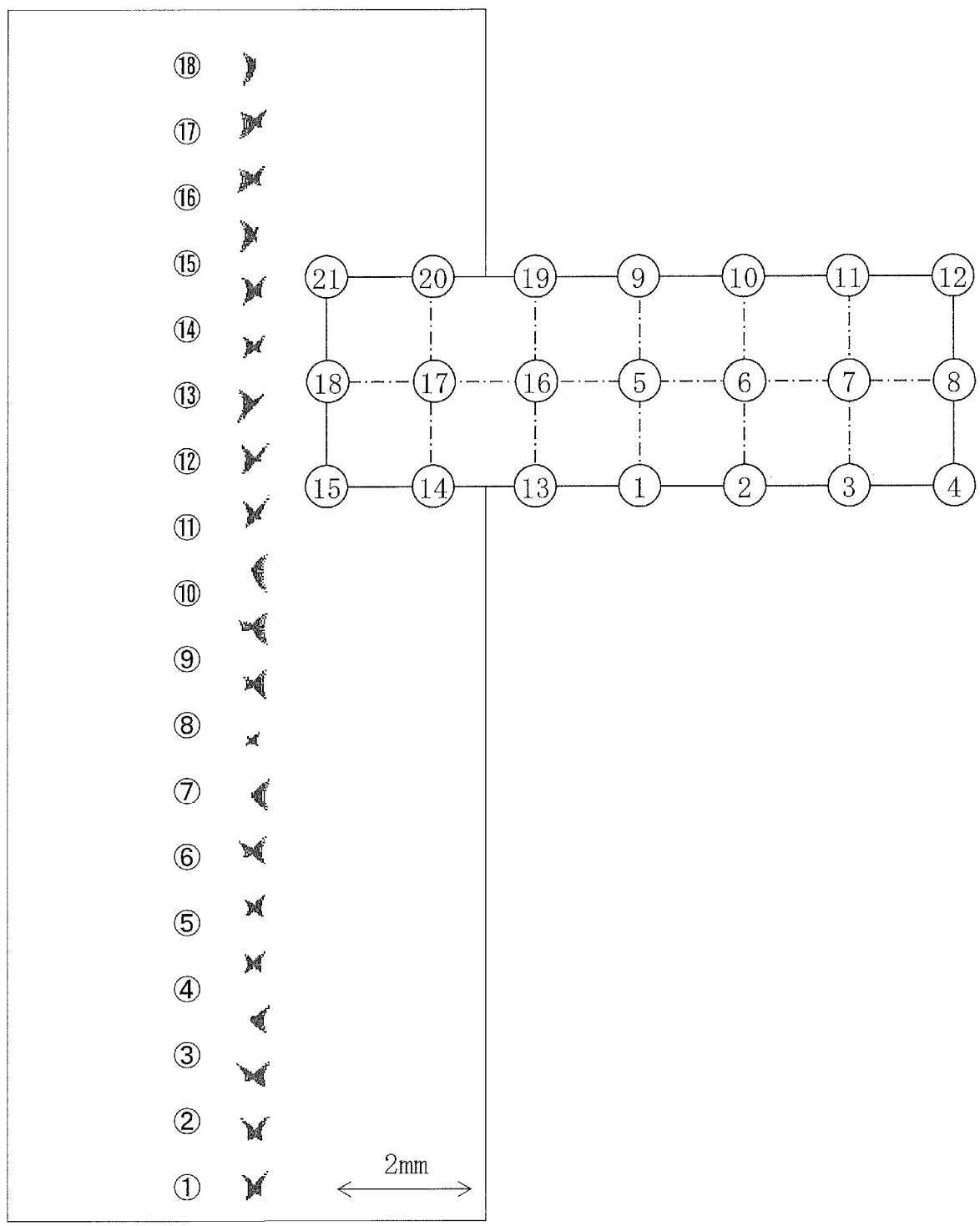
FIG. 9 is a spot diagram of the ocular optical system of the first embodiment.

Next, the optical performance of the first embodiment will be explained using FIG. 7 to FIG. 9. FIG. 7 is a drawing for explaining the relation between the virtual image plane 7 and a projected virtual image plane 70 viewed from the driver 8. FIG. 8 is a drawing that expresses the distortion property of the head-up display device of the first embodiment. FIG. 9 is a spot diagram of the head-up display device of the first embodiment.

Although the torsion property in the virtual image plane 7 having the curved surface shape of FIG. 7 becomes a large torsion amount as shown in FIG. 8(b), because the virtual image plane 7 itself has the curved surface shape, the torsion property in the virtual image plane 7 is different from the apparent torsion property as seen from the driver. In this regard, the result of the calculation of the torsion property in the projected virtual image plane 70 to the tangential plane that is tangent to the virtual image plane 7 with reference to the position of the eyes of the driver is FIG. 8(a), and it is known that the torsion property as seen from the eyes of the driver is in a rectangular shape.

FIG. 9 shows a spot diagram obtained by arranging an object point at the virtual image plane 7 and calculating the spot diagram at the screen plate 4, and excellent optical performance has been achieved. Also, this spot diagram is for the total light flux of a case where the size of the eye box 9 is 100 mm horizontal×50 mm vertical. In the case of a virtual image viewed by an actual driver, the spot diagram in the size of the pupil of the eye of a human being (said to be 7 mm in diameter at maximum) is substantially improved compared to FIG. 9.

Next, FIG. 10 is a drawing that shows the virtual image distance at respective points in the field of view of the virtual image plane 7. The shape of the virtual image plane namely the virtual image distances to respective points of the virtual image plane have become the maximum value of 16.2 m at the center of the upper side of the virtual image plane 7, 12.2 m at the right and left ends of the upper side, 13.0 m at the center of the lower side of the virtual image plane 7, and 11.1 m at the right and left ends of the lower side.

Figure 13:
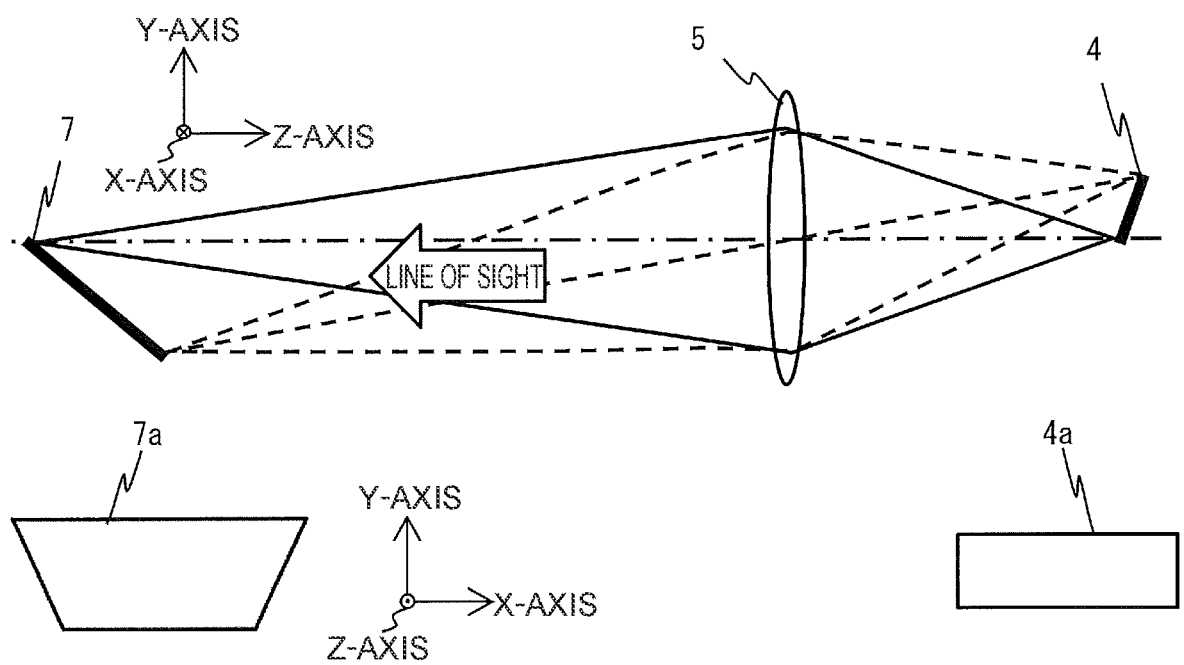
FIG. 13 is a drawing for explaining a mapping relation in an inclined plane.

The action and effect of the present embodiment will be explained. FIG. 13 is a drawing that shows the line of sight and the virtual image plane in the relation with the ocular optical system 5. Since the virtual image plane 7 is tilted with respect to the ocular optical system 5, in order to satisfy the mapping relation, it is necessary to tilt the object plane namely the screen plate (diffusion plate) 4 to the opposite direction of the virtual image plane 7. This mapping direction represents the Scheimpflug principle.

At this time, when the shape of the picture light on the screen plate (diffusion plate) 4 is made a rectangular shape (reference sign 4a), the image on the virtual image plane 7 normally becomes such trapezoidal shape (reference sign 7a) as shown in FIG. 13.

FIG. 14 is a drawing for explaining a state where the picture light on the liquid crystal display panel 2 is mapped on the screen plate (diffusion plate) 4 by the relay optical system 3.

FIG. 14(a) shows an arrangement for allowing the picture light having passed through the screen plate (diffusion plate) 4 to be headed to the ocular optical system 5. According to this arrangement, because the real image of the liquid crystal display panel 2 by the relay optical system 3 is formed obliquely with respect to the screen plate (diffusion plate) 4, the resolution of the picture light on the screen plate (diffusion plate) 4 deteriorates.

Meanwhile, FIG. 14(b) shows an arrangement giving priority to the resolution at the screen plate (diffusion plate) 4 because the positions of the image of the liquid crystal display panel 2 and the screen plate (diffusion plate) 4 can be made agree to each other by arranging the liquid crystal display panel 2, the relay optical system 3, and the screen plate (diffusion plate) 4 in parallel. However, according to this arrangement, because the emission direction of the picture light of the regular transmission passing through the screen plate (diffusion plate) 4 is shifted from the disposal direction of the ocular optical system 5, even when there is a diffusion action in the screen plate (diffusion plate) 4, the virtual image eventually displayed becomes dark.

Further, although the beam heading to the ocular optical system can be secured by increasing the degree of diffusion of the screen plate (diffusion plate) 4, because the picture light is largely diffused, the eventual virtual image becomes dark in this case also.

In the explanation described above, it was configured that the real image obtained by mapping the picture light at the liquid crystal display panel 2 by the relay optical system 3 was diffused by the screen plate (diffusion plate) 4. Although such configuration is also possible that the liquid crystal display panel (and the diffusion plate) is arranged directly at the position of the screen plate (diffusion plate), even in this case, similarly to FIG. 14(b), the light flux having emitted from the liquid crystal display panel is shifted from the disposal direction of the ocular optical system, and therefore the eventual virtual image becomes dark.

As described above, in the case of the configuration of simply tilting the virtual image plane, it is hard to achieve both of brightness and high resolution of the virtual image. Meanwhile, according to the present embodiment, by forming the virtual image plane into a curved surface shape and employing a free-form curved surface mirror and a free-form curved surface lens having the aberration correction capacity in oblique projection, both of securing of brightness and suppression of deterioration of resolution of the virtual image can be achieved.

Also, the virtual image plane has been made a curved surface without making the screen plate (diffusion plate) a curved surface, easiness of manufacture has been achieved simultaneously, and, as explained in FIG. 14(a), it has been possible also to prevent deterioration of resolution at the screen plate (diffusion plate).

According to the present embodiment, such head-up display device can be provided in which the virtual image plane shape is made a part of a concave shape as viewed from the driver side although the display image at the screen plate (diffusion plate) is in a plane surface shape by a projection optical system using a free-form curved surface lens and a free-form curved surface mirror.

Also, according to the head-up display device according to the present embodiment, such display is possible as display of the attention arousing information on the preceding vehicle in the virtual image range corresponding to the position of the preceding vehicle, display of existence of a fallen object in the virtual image range corresponding to the position of the road surface of the road before the preceding vehicle, and so on.

Further, it is preferable that information of "speed of own vehicle" and so on that are not related with an attention arousing object within the foreground are displayed in a virtual image range corresponding to the position of the preceding vehicle which falls in the viewing direction in a normal driving state.

Second Embodiment

Figure 15:
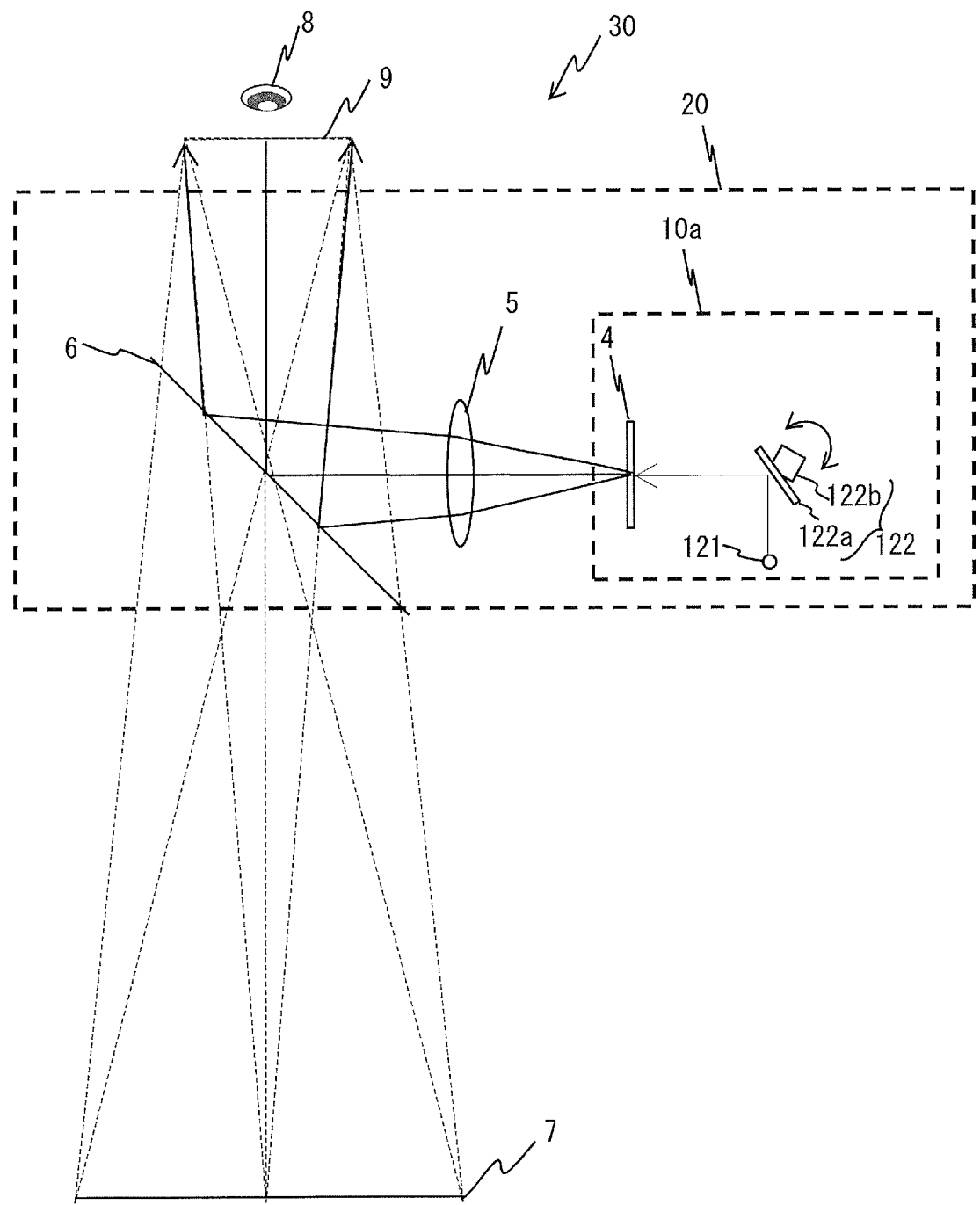
FIG. 15 is a schematic configuration drawing of a head-up display device using micro-electromechanical systems.

The second embodiment is characterized in a point that the configuration of the image forming unit 10 is different from that of the first embodiment. FIG. 15 is a schematic configuration drawing of a head-up display device using micro-electromechanical systems.

As shown in FIG. 15, instead of the image forming unit 10 of the first embodiment, an image forming unit 10a according to the second embodiment may use the image forming unit 10a using micro-electromechanical systems that include a laser light source 121, a light scanning unit 122 that executes light scanning of the laser light source 121 and includes a mirror 122a and a mirror drive unit 122b that changes the angle of the mirror 122a with respect to the laser light source 121, and a screen plate 123 that has a diffusion function.

Third Embodiment

Figure 16:
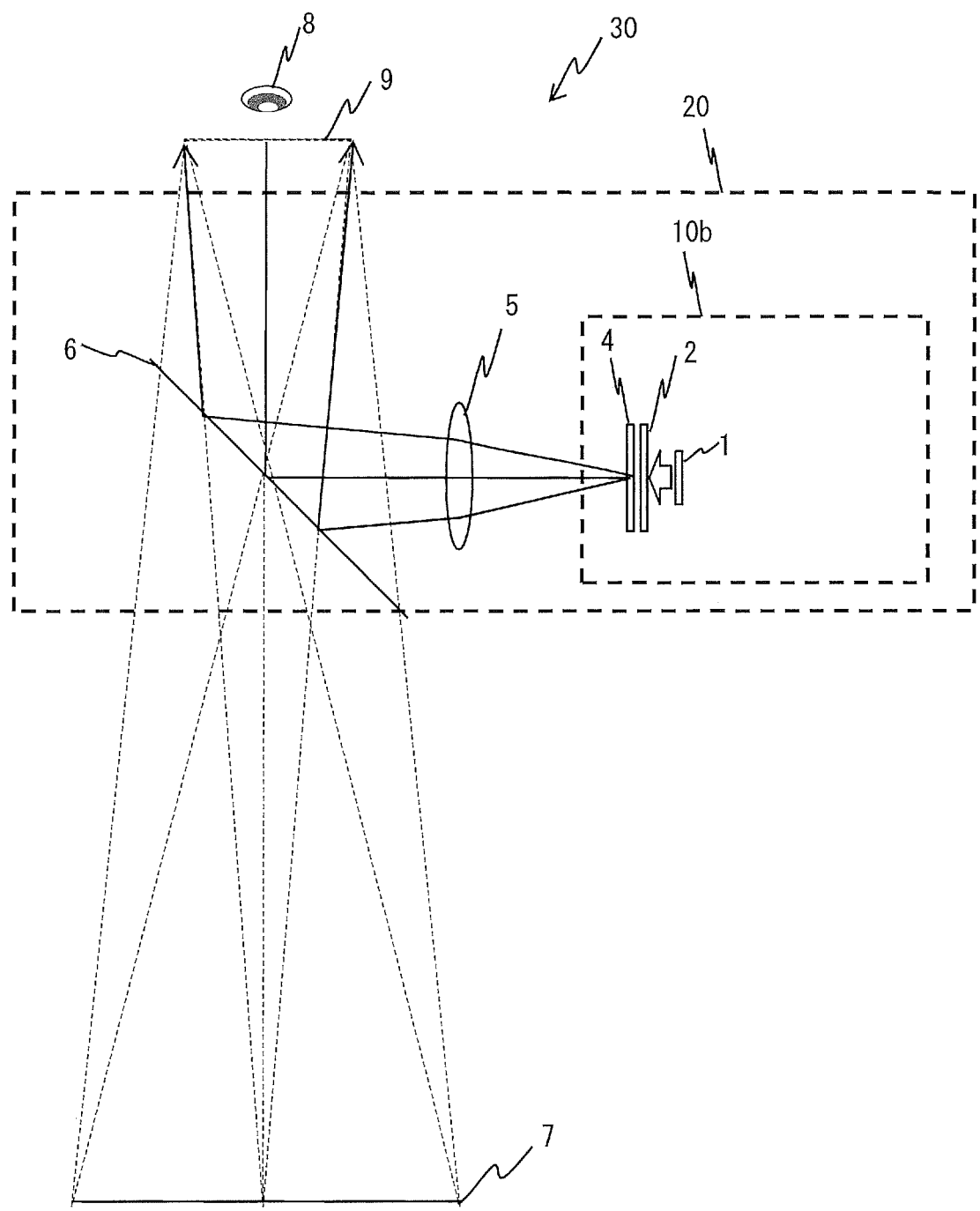
FIG. 16 is a schematic configuration drawing of a head-up display device of a liquid crystal display panel system not using a relay optical system.

The third embodiment is also characterized in a point that the configuration of the image forming unit 10 is different from that of the first embodiment. FIG. 16 is a schematic configuration drawing of a head-up display device of a liquid crystal display panel system not using a relay optical system. Although the picture light of the liquid crystal display panel 2 is mapped by the relay optical system 3 in the first embodiment as shown in FIG. 10, in an image forming unit 10b according to the third embodiment, as shown in FIG. 16, it is configured to radiate the light of the backlight 1 directly onto the liquid crystal display panel 2 larger than that of the first embodiment, and to display the light as the virtual image 7 by the ocular optical system 5 as the picture light flux including the picture information displayed on the liquid crystal display panel 2.

Also, in this third embodiment, when the spread of the light flux of the backlight 1 is insufficient, a diffusion plate is arranged in the vicinity of the liquid crystal display panel 2.

Further, as an effect common to the first and second embodiments, compactization of the head-up display device is achieved by bending the optical path by a mirror arranged between the free-form curved surface lens and the free-form curved surface mirror and thereby bending the optical path into a Z-shape along with the free-form curved surface mirror. Also, according to the configuration of arranging the head-up display device body excluding the free-form curved surface mirror in the vicinity of the back mirror without arranging the mirror between the free-form curved surface lens and the free-form curved surface mirror, this mirror can be made unnecessary.

Further, in a configuration of allowing deterioration of resolution of the virtual image plane, such configuration is also possible that a free-form curved surface lens is not arranged between a curved surface lens and a free-form curved surface mirror. In this case also, similarly to respective embodiments described above, it is possible to make the plane of the displayed image projected to the virtual image plane (projected virtual image plane) have a plane surface shape and to make the virtual image plane have a concave shape or a partial shape of the concave shape as viewed from the side light is made to be incident on the virtual image plane.

REFERENCE SIGNS LIST

1 . . . Backlight
2 . . . Liquid crystal display panel
3 . . . Relay optical system
4 . . . Screen plate (diffusion plate)
5 . . . Ocular optical system
6 . . . Windshield
7 . . . Virtual image plane
8 . . . Eyes of driver
9 . . . Eye box
10 . . . Image forming unit
51 . . . First lens
52 . . . Second lens
53 . . . Third lens
54 . . . Free-form curved surface lens
55 . . . Cylinder mirror
56 . . . Free-form curved surface mirror
70 . . . Projected virtual image plane
101 . . . Own vehicle
102 . . . Preceding vehicle
103 . . . Long distance line of sight
104 . . . Short distance line of sight
105 . . . Road surface

The invention claimed is:
1. A projection optical system, comprising:
an ocular optical system that displays a virtual image by reflecting light emitted from an image forming unit that emits light including image information,
wherein the ocular optical system includes a spherical lens, a free-form curved surface mirror and a free-formed curved surface lens,
wherein the free-form curved surface lens is disposed between the spherical lens and the free-form curved surface mirror, of the ocular optical system, along the emission direction of the light,
wherein the image forming unit includes a liquid crystal display panel, a relay optical system, and a screen plate, and
wherein the light is emitted from the free-form curved surface lens to the free-form curved surface mirror without forming an intermediate image in between, and the light forms the intermediate image on the screen plate.

2. The projection optical system according to claim 1, wherein a reflecting mirror is further arranged between the free-form curved surface lens and the free-form curved surface mirror.

3. The projection optical system according to claim 1,
wherein a plane of a display image projected to a virtual image plane by the ocular optical system has a plane surface shape, and
the virtual image plane has a concave shape or a partial shape of the concave shape as viewed from the side where the light is made to be incident on the virtual image plane.

4. The projection optical system according to claim 3, wherein a cross section in the vertical direction of the virtual image plane has such shape that virtual image distance in line of sight on the upper side as viewed from an observer of the virtual image positioned on the side where the light is made to be incident on the virtual image plane is longer than virtual image distance in the line of sight on the lower side.

5. The projection optical system according to claim 3, wherein a cross section in the horizontal direction of the virtual image plane has such shape that virtual image distance in line of sight of the front as viewed from an observer of the virtual image positioned on the side where the light is made to be incident on the virtual image plane is longer than virtual image distance in the line of sight on the right and left sides.

6. A head-up display device, comprising:
an image forming unit that emits light including image information; and
an ocular optical system that displays a virtual image observed by a driver by reflecting light emitted from the image forming unit,
wherein the ocular optical system includes a spherical lens, a free-form curved surface mirror and a free-formed curved surface lens,
wherein the spherical lens, the free-formed curved surface lens and the free-form curved surface mirror, of the ocular system, are disposed in this order along the emission direction of the light,
wherein the image forming unit includes a liquid crystal display panel, a relay optical system, and a screen plate, and
wherein the light is emitted from the free-form curved surface lens to the free-form curved surface mirror without forming an intermediate image in between, and the light forms the intermediate image on the screen plate.

7. The head-up display device according to claim 6, wherein a reflecting mirror is further arranged between the free-form curved surface lens and the free-form curved surface mirror.

8. The head-up display device according to claim 6,
wherein a plane of a display image projected to a virtual image plane by the ocular optical system has a plane surface shape, and
the virtual image plane has a concave shape or a partial shape of the concave shape as viewed from the driver.

9. The head-up display device according to claim 8, wherein a cross section in the vertical direction of the virtual image plane has such shape that virtual image distance in the line of sight on the upper side as viewed from the driver is longer than virtual image distance in the line of sight on the lower side.

10. The head-up display device according to claim 8, wherein a cross section in the horizontal direction of the virtual image plane has such shape that virtual image distance in the line of sight of the front as viewed from the driver is longer than virtual image distance in the line of sight on the right and left sides.

11. The head-up display device according to claim 6, wherein the image forming unit is configured to include a liquid crystal display panel that displays image information becoming a mapping object and has transmittivity, a relay optical system on which a light flux having passed through the liquid crystal display panel and including the image information is made to be incident, and the screen plate that has a diffusion function.

12. The head-up display device according to claim 6, wherein the image forming unit is configured to include a laser light source, a light scanning unit that executes light scanning of the laser light source, and the screen plate that has a diffusion function.

13. The projection optical system according to claim 1, further comprising:
a relay optical system disposed within the image forming unit and before the ocular optical system along the emission direction of the light.

* * * * *